United States Patent
Frary et al.

[19]

[11] Patent Number: 5,538,277
[45] Date of Patent: Jul. 23, 1996

[54] PASSENGER AIR BAG MODULE FASTENERLESS COVER ATTACHMENT

[75] Inventors: Lisa M. Frary, South Weber; Larry D. Rose, Layton; Edward Friery, Coalville, all of Utah

[73] Assignee: Morton International, Inc., Chicago, Ill.

[21] Appl. No.: 488,669

[22] Filed: Jun. 8, 1995

[51] Int. Cl.⁶ .................................................. B60R 21/20
[52] U.S. Cl. .................................. 280/728.2; 280/728.3; 280/732
[58] Field of Search ................................ 280/731, 732, 280/728.2, 728.3

[56] References Cited

U.S. PATENT DOCUMENTS

| | | | |
|---|---|---|---|
| 5,280,946 | 1/1994 | Adams et al. | 280/728.2 |
| 5,290,059 | 3/1994 | Smith et al. | 280/728.2 |
| 5,306,040 | 4/1994 | Leonelli et al. | 280/728.3 |
| 5,316,333 | 5/1994 | Kokeguchi | 280/728.2 |
| 5,322,324 | 6/1994 | Hansen et al. | 280/732 |
| 5,332,256 | 7/1994 | Lauritzen et al. | 280/728.2 |
| 5,332,257 | 7/1994 | Rogers et al. | 280/728.3 |
| 5,333,900 | 8/1994 | Strahl et al. | 280/731 |
| 5,338,060 | 8/1994 | Soderquist | 280/728.2 |
| 5,380,037 | 1/1995 | Worrell et al. | 280/728.2 |
| 5,398,960 | 3/1995 | Ravenberg et al. | 280/728.3 |
| 5,407,224 | 4/1995 | Bauer et al. | 280/728.2 |
| 5,407,225 | 4/1995 | Cooper | 280/728.3 |

*Primary Examiner*—Kenneth R. Rice
*Attorney, Agent, or Firm*—Corinne R. Gorski; Gerald K. White

[57] ABSTRACT

A fastenerless air bag module attachment assembly for securing a molded plastic cover to a module housing. The housing includes a trough-shaped body having opposed ends, and a top and bottom wall. An end plate is attached to each opposed sides of the body. The cover has a front face and top, bottom and opposed side legs extending therefrom. Two separate attachment features are provided to secure the cover to the housing. First, the top and bottom cover legs each include an integral attachment, for example, a projection, which slides into a channel disposed integrally in the top and bottom walls of the housing. Secondly, the housing end plates each include a pair of protruding tabs formed integrally therewith. The tabs extend through openings provided in the cover side legs when the housing and cover are assembled. One side leg of the cover is hingedly connected to the front face of the cover to permit assembly. After the cover is properly positioned on the housing, the tabs protruding through the cover openings are deflected to secure the cover in place on the housing.

11 Claims, 3 Drawing Sheets

5,538,277

PASSENGER AIR BAG MODULE FASTENERLESS COVER ATTACHMENT

BACKGROUND OF THE INVENTION

1. Field of the Invention:

The present invention relates to an attachment assembly for an air bag module housing and cover, and more particularly to a module housing and cover attachment assembly having integral fastening means.

2. Description of the Related Art:

Conventional passenger air bag module assemblies consist of a module housing enclosing an inflator and air bag, and a cover which interfaces with both the module housing and vehicle instrument panel (IP). Due to high deployment forces the attachment between the module housing and cover must be strong and reliable.

Multiple fasteners are typically used to attach the cover to the module housing. U.S. Pat. No. 5,280,946 discloses separate retaining clips for securing the cover and housing together during inflation of the air bag. Another common attachment scheme is the use of a plurality of independent fasteners, such as bolts, etc.

One problem with such prior art assemblies is that the components are hard to assemble, increasing manufacturing time and costs. Another problem is that these separate fastening means are not entirely reliable, which could result in passenger injury if any pieces of the cover were to break free during inflation of the air bag.

SUMMARY OF THE INVENTION

It is an object of the present invention to overcome the deficiencies of the prior art by providing a cover to module housing attachment assembly that is easy to assemble, without the need for extra fasteners which lowers manufacturing and component costs.

Another object of the invention is to provide a cover and module housing attachment assembly that is easy to assemble. Since no extra fasteners are required, the cover and module assembly of the present invention can be assembled quickly and easily.

Still another object of the invention is to provide a cover and module housing attachment assembly which is strong enough to withstand deployment forces.

Another object of the invention is to provide a cover and module housing which have a simple design and are economical and simple to manufacture.

The present invention achieves the foregoing objectives by providing an air bag module attachment assembly comprising a module housing and a cover. The housing includes a trough-shaped body having opposed ends, and a top and bottom wall. An end plate is attached to each opposed sides of the body. The cover includes a front face and top, and bottom and opposed side legs extending from the front face. At least one of the side legs is hinged to the front face to aid in assembly. First attachment means attach the top and bottom legs of the cover with the top and bottom walls of the housing, respectively. The first attachment means comprise a pair of interlocking joints, one of the joints securing the top cover leg to the top housing wall and the other joint securing the bottom cover leg to the bottom housing wall. The interlocking joints include a projection located on an end of the top and bottom cover legs and a channel located on an end of the top and bottom housing walls, wherein during assembly the projections are slidably received within the respective channels. Second attachment means attach the side legs of the cover and the end plates of the housing together. The second attachment means include a pair of tabs integrally disposed on each of the opposed end plates of the housing and a pair of openings disposed on each of the opposed side legs of the cover, wherein when the housing and cover are assembled the pair of tabs of the housing end plates extend through the respective pair of openings in the cover side legs.

Other features and advantages of the present invention will become apparent from the following description of the invention which refers to the accompanying drawings.

DESCRIPTION OF THE PREFERRED EMBODIMENT

Figure 1:
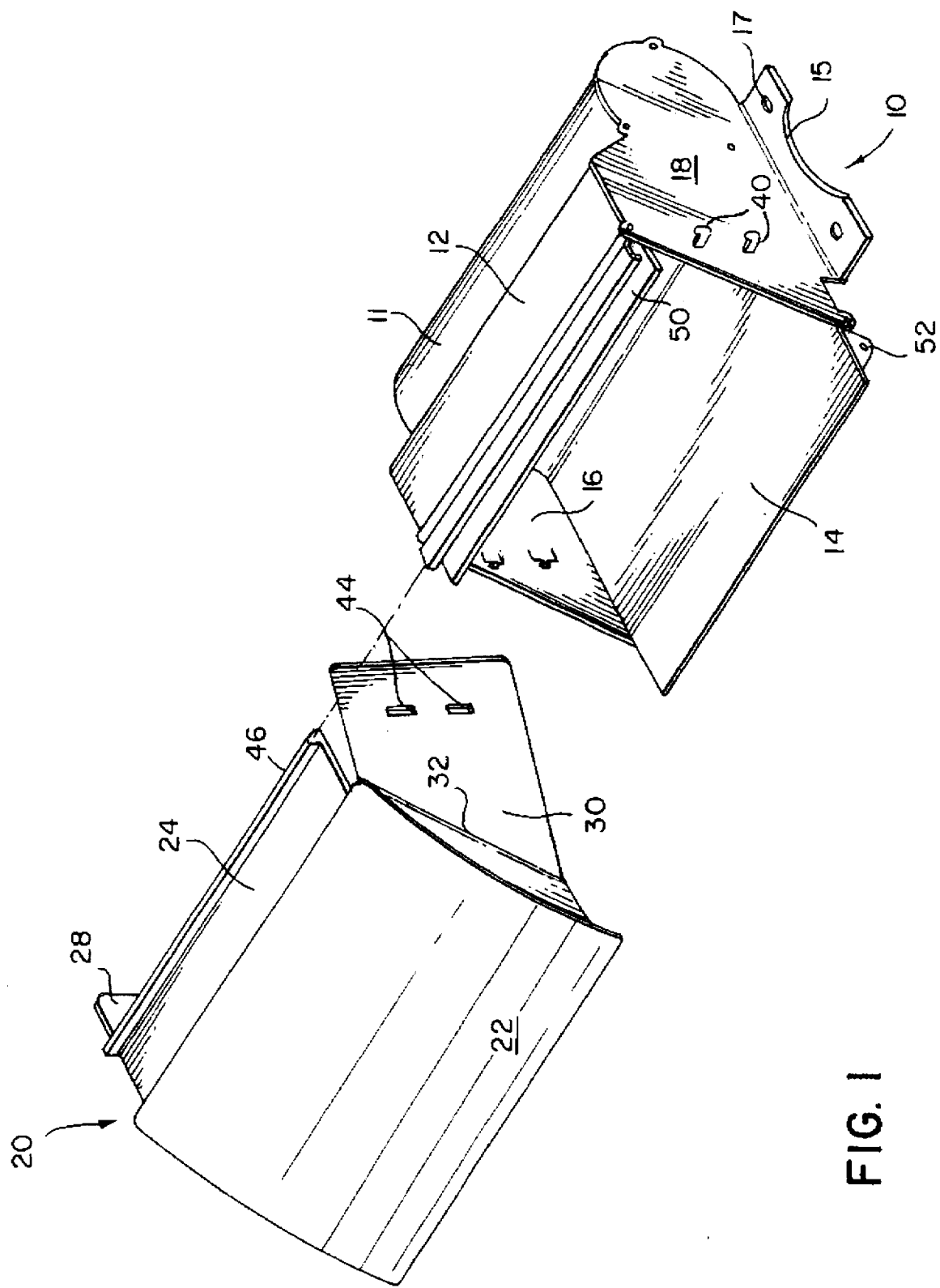
FIG. 1 is a perspective view of the cover and module housing of the present invention.
Figure 2:
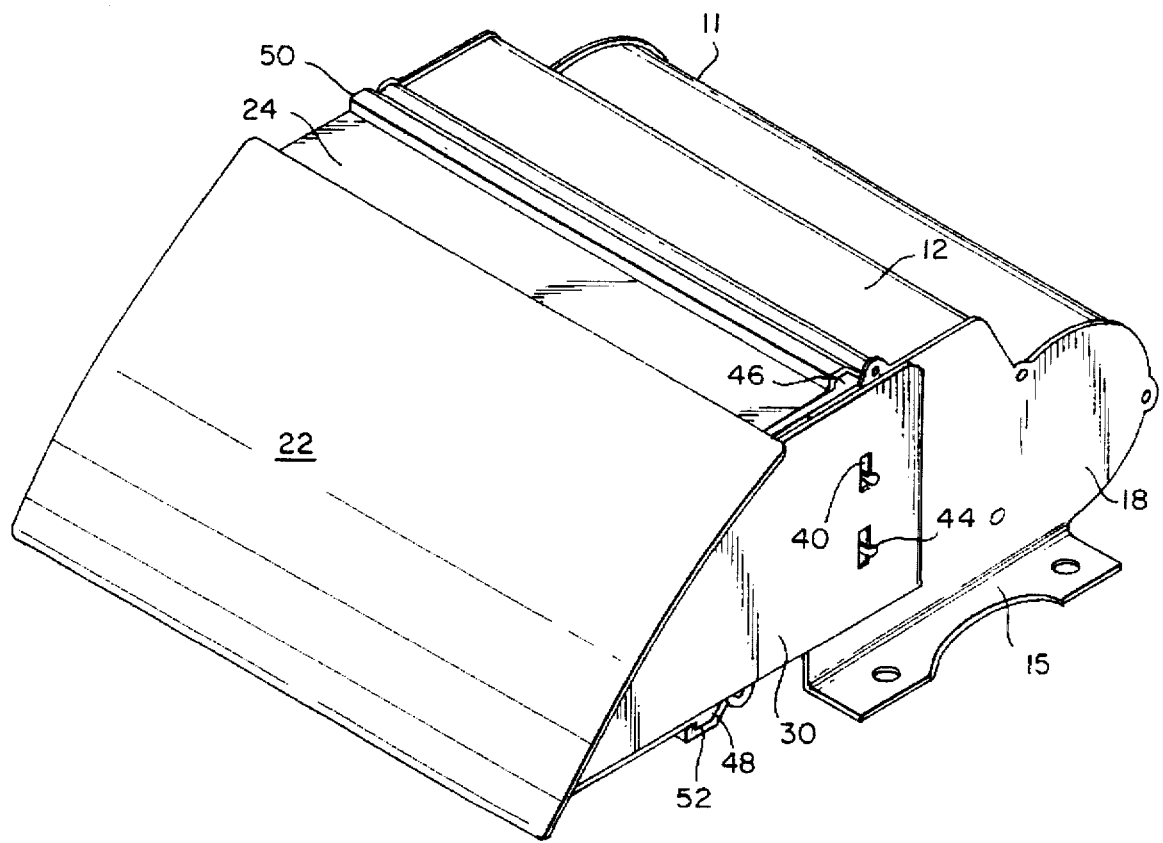
FIG. 2 is a perspective view of the assembled cover and housing.

Referring to FIGS. 1 and 2, the fastenerless air bag module attachment assembly of the present invention includes a module housing 10 and a molded plastic cover 20.

Housing 10 is designed to enclose an air bag module (not shown) which is positioned within an instrument panel of an automobile (not shown). Housing 10 includes a trough-shaped body 11 enclosed on either side by end plates 16, 18. As is well known in the art, the body of the housing can be extruded into a continuous length of material, for example aluminum, and then cut into various lengths.

End plates 16, 18 each include a flange 15 mounted on opposite, exterior sides thereof. Flange 15 includes apertures 17 for mounting housing 10 in the instrument panel substructure (not shown). Cover 20 seals off and closes the open upper end of the housing 10. Cover 20 can be manufactured from a homogenous thermoplastic molded member.

As shown in FIG. 1, housing 10 includes a top wall 12, a bottom wall 14 and end plates 16, 18. Cover 20 includes a front face 22 and integrally formed, rearwardly extending top and bottom legs 24, 26 (see FIGS. 3A and 3B), and straight side legs 28 and 30.

Side leg 30 is hingedly connected to face 22 at hinge 32 so that the cover and housing can be assembled. Hinge 30 is formed by a line of decreased thickness of the thermoplastic material during manufacture of the cover. Opposed side leg 28 is fixedly attached to front face 22. It should be apparent that both side legs of cover 20 can be hingedly connected to front face 22.

Next, referring to FIGS. 1 through 3E, the attachment of the cover and housing of the present invention will be described. The attachment assembly includes two different attach schemes for the sides and the top and bottoms of the cover and housing.

Figure 3A:
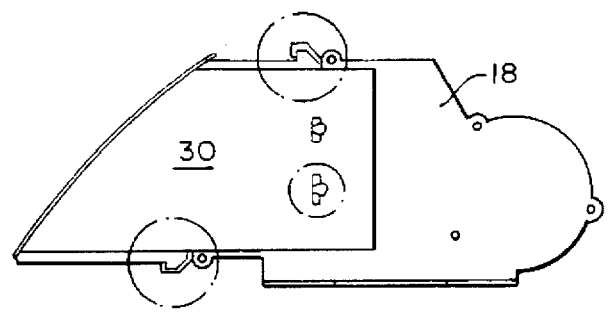
FIG. 3A is a partial side view of the assembled cover and housing of the present invention.
Figure 3B:
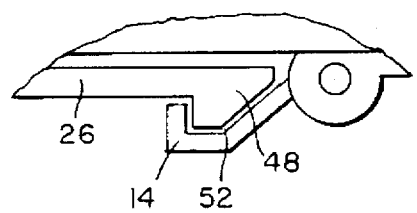
FIGS. 3B and 3C are enlarged views of the engagement of the upper and lower projections of the cover and the upper and lower channels of the housing of the present invention.
Figure 3C:
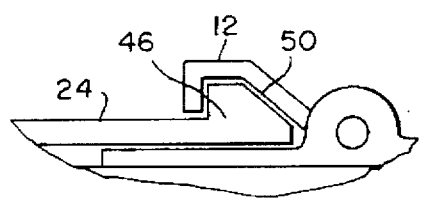

First attachment means comprise a strong interlocking joint which secures the top and bottom walls 12, 14 of the housing with the top and bottom legs 24, 26 of the cover. The first attach means includes projections 46, 48 located on the end of top and bottom legs 24, 26 of cover 20, as shown in FIGS. 3A–3C. Projections 46, 48 are slidably received within channels 50, 52 located on the ends of the top and bottom walls 12, 14 of housing 10. The top and bottom attach joints formed by projections 46, 48 and channels 50, 52 extend along the entire length of the housing and cover, as shown in FIG. 2. This permits deployment loads to be distributed over the full length of the cover and housing and results in a stronger joint than a conventional fastener attachment which concentrates the load at each fastener.

Both the projections 46, 48 and the channels 50, 52 are located on the exterior surface of the respective legs and walls. Thus, the load bearing surface of the projections and channels is concentrated on the exterior of cover legs 24, 26 and walls 12, 14.

Moreover, the first attachment means, although shown in the shape of a projection and channel, can vary in shape and size, but is located on the exterior surface of the legs and walls to make housing 10, and especially cover 20, easy and economical to manufacture.

Figure 3D:
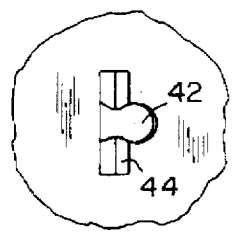
FIG. 3D is an enlarged side view of the engagement of the tabs of the housing extending through the openings in the side legs of the cover.
Figure 3E:
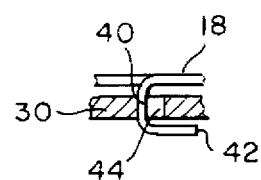
FIG. 3E is an enlarged cross-section of the tab and opening fastening arrangement of the present invention.

Second attachment means attach the side legs 28, 30 of cover 20 to the end plates 16, 18 of housing 10. The second attachment means include a pair of integral tabs 40 located on both end plates 16, 18 of housing 10. Tabs 40 can be directly stamped from the end plates and protrude laterally therefrom prior to assembly of the housing and cover. A corresponding pair of openings 44 are provided in the side legs 28, 30 of cover 20. When the cover and housing are assembled a free end 42 of tabs 40 extends through the respective openings 44, as shown in FIG. 3D. Once cover 20 is properly in place on housing 10, the tabs 40 are bent, as shown in FIG. 3E, to secure the cover in place and provide retention of the cover pieces during a module deployment.

During assembly, the air bag inflator assembly, not shown, is placed within housing 10. Hinged leg 30 is opened wide enough to fit the necessary portion of housing 10 therethrough. The projections 46, 48 of cover 20 are then inserted into the end of channels 50,52 of housing 10. Due to hinged leg 30, cover 20 can be slid over housing 10. The tabs 40 on the fixed cover side leg 28 extend through openings 4 of end plate 16. Hinged cover side leg 30 can than be swung back inwardly such that tabs 40 of end plate 18 protrude through openings 44 of side leg 30. After the cover is properly positioned tab ends 42 are deflected to secure the cover in place.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An air bag module attachment assembly comprising:

a module housing including a body having opposed sides and a top and bottom wall, and an end plate attached to each of said opposed ends;

a cover having a front face and a top, a bottom and opposed side legs extending from said front face, at least one of said side legs being hingedly connected to said front face;

first attachment means for attaching said top and bottom legs of said cover with said top and bottom walls of said housing, respectively; and second attachment means for attaching said side legs of said cover and said end plates of said housing together.

2. The air bag module attachment assembly of claim 1, wherein said first and second attachment means are integral with said housing and cover.

3. The air bag module attachment assembly of claim 1, wherein said first attachment means comprise a pair of interlocking joints, one of said joints securing said top cover leg to said top housing wall and the other joint securing said bottom cover leg to said bottom housing wall.

4. The air bag module attachment assembly of claim 3, wherein each of said interlocking joints include a projection located on an end of the top and bottom cover legs, respectively, and a channel located on an end of the top and bottom housing walls, respectively, wherein during assembly the projections are slidably received within the respective channels.

5. The air bag module attachment assembly of claim 4, wherein each of said projections extends along an entire length of the respective top and bottom cover legs.

6. The air bag module attachment assembly of claim 4, wherein each of said projections extend from an exterior surface of the respective top and bottom cover legs.

7. The air bag module attachment assembly of claim 4, wherein each of said channels extend along an entire length of the respective top and bottom walls of said housing.

8. The air bag module attachment assembly of claim 4, wherein each of said channels is located on an exterior surface of the respective top and bottom housing walls.

9. The air bag module attachment assembly of claim 1, wherein said second attachment means includes a pair of tabs integrally disposed on each of said end plates of said housing and a pair of openings disposed on each of said opposed side legs of said cover, wherein when said housing and cover are assembled said pair of tabs of said housing end plates extend through the respective pair of openings in said cover side legs.

10. The air bag module attachment assembly of claim 1, wherein said housing is made of a plastic molded material.

11. A method of assembling an air bag module assembly, comprising the steps of:

providing a module housing, said housing including a top wall, a bottom wall and opposed end plates;

providing a cover, said cover having a front face and a top, a bottom and opposed side legs extending from said front face, at least one of said side legs being hingedly connected to said front face;

bending said hinged side leg of said cover outwardly and sliding said cover over said housing, such that a projection disposed on an end of both of said top and bottom cover legs engages a channel disposed on an end of both of said top and bottom housing walls, respectively;

positioning said cover on said housing such that a first pair of tabs disposed on one of said housing end plates extend through a first pair of openings located in the other cover side leg;

bending said hinged side leg of said cover inwardly until a second pair of tabs disposed on the other housing end plate extend through a second pair of openings located in said hinged cover side leg; and deflecting both the first and second pairs of tabs to secure said cover and housing together.

\* \* \* \* \*

UNITED STATES PATENT AND TRADEMARK OFFICE
CERTIFICATE OF CORRECTION

PATENT NO. : 5,538,277
DATED : 23 July 1996
INVENTOR(S) : Lisa M. Frary, Larry D. Rose and Edward Friery It is certified that error appears in the above-indentified patent and that said Letters Patent is hereby corrected as shown below:

At column 3, lines 46 and 47, "openings 4 of end plate 16."
should be
--openings 44 of end plate 16.--.

Signed and Sealed this

Fifth Day of August, 1997

Attest:

BRUCE LEHMAN

Attesting Officer

Commissioner of Patents and Trademarks